Aug. 7, 1928.

B. RUDOLFF 1,679,377

SAW SHARPENING MACHINE

Filed July 27, 1926

4 Sheets-Sheet 1

Inventor:
Barnett Rudolff.
By his Attorney

Aug. 7, 1928. 1,679,377
B. RUDOLFF
SAW SHARPENING MACHINE
Filed July 27, 1926 4 Sheets-Sheet 2
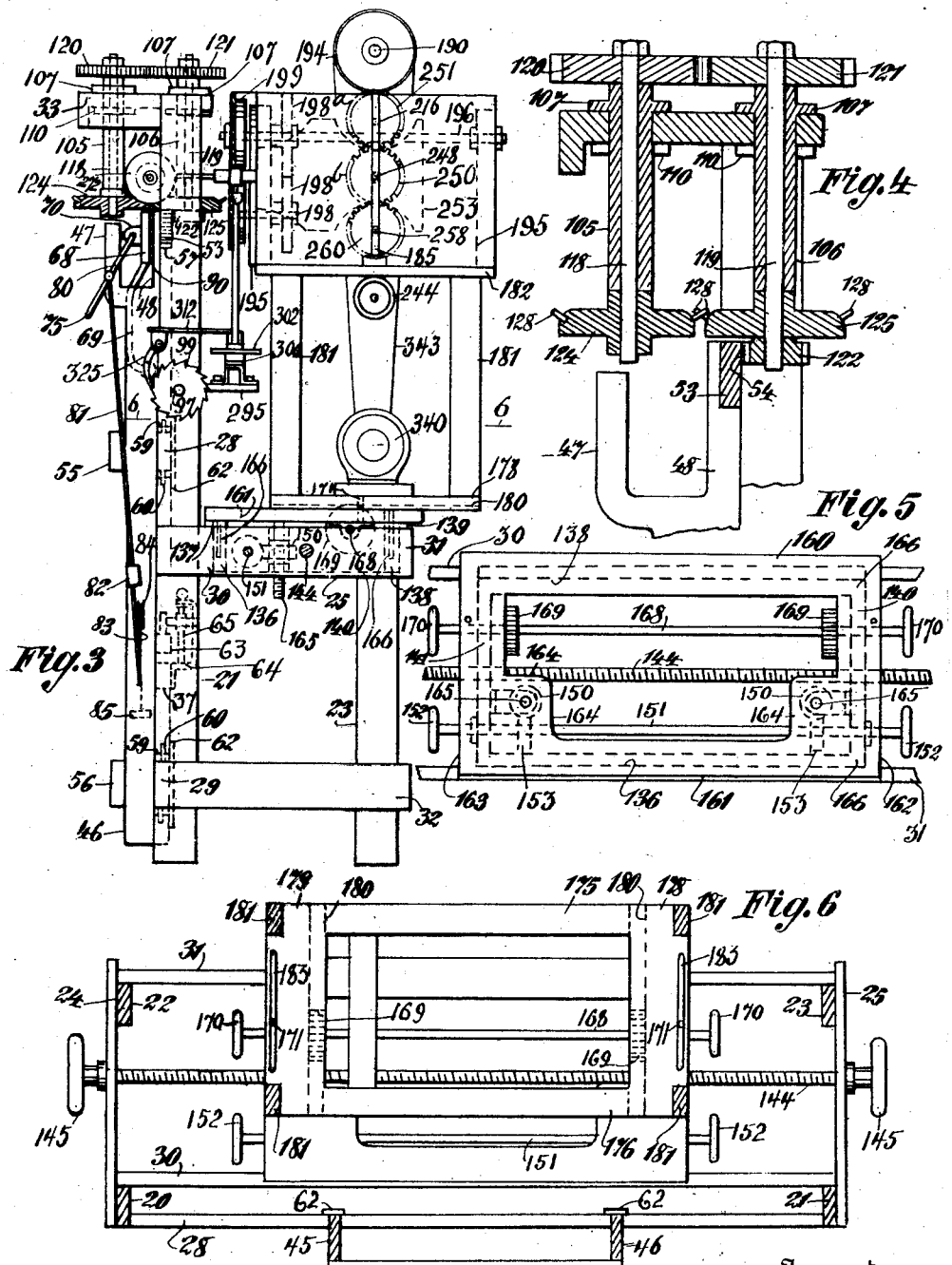
Inventor
Barnett Rudolff.
By his Attorney

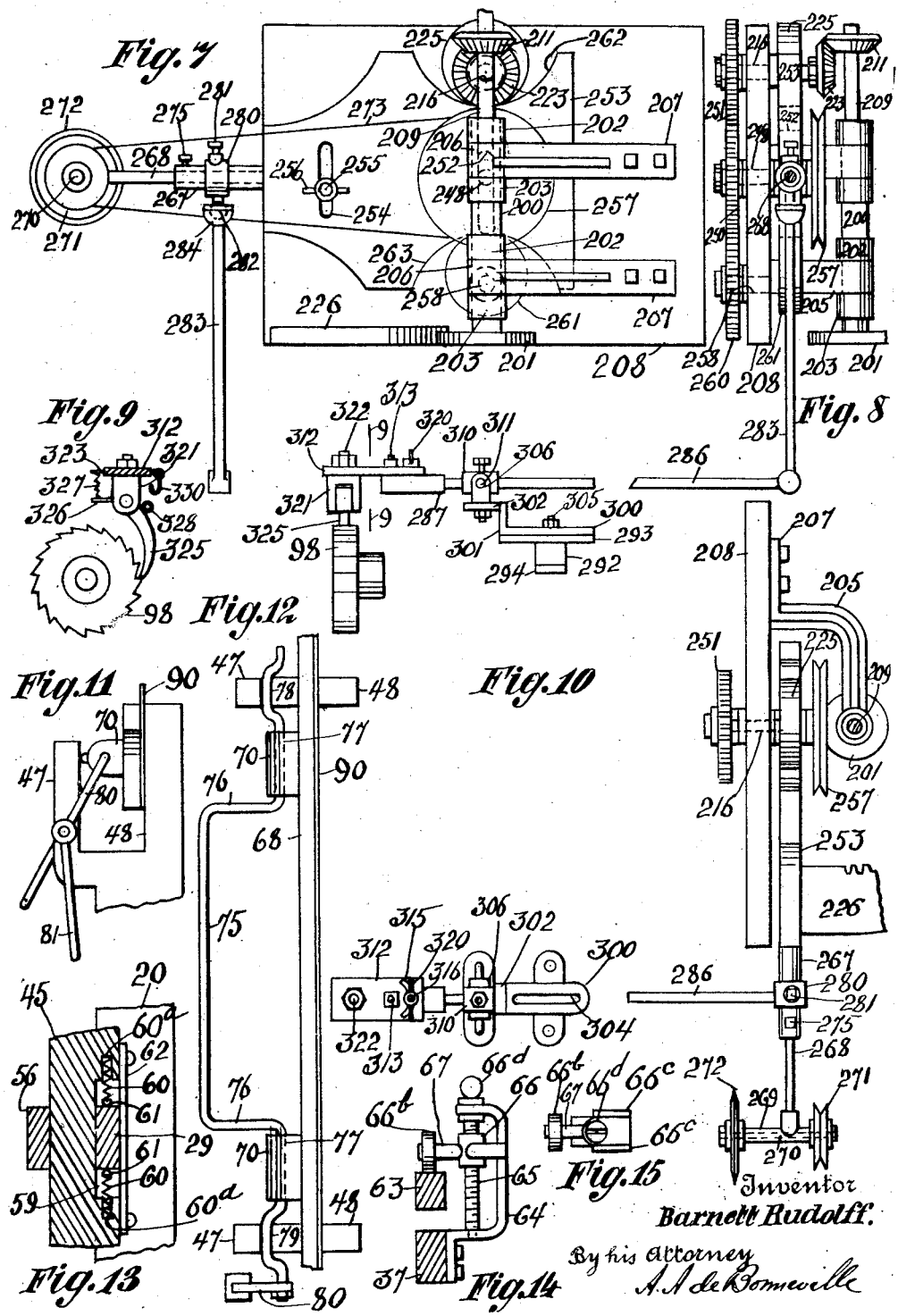

Aug. 7, 1928.
B. RUDOLFF
1,679,377
SAW SHARPENING MACHINE
Filed July 27, 1926     4 Sheets-Sheet 4
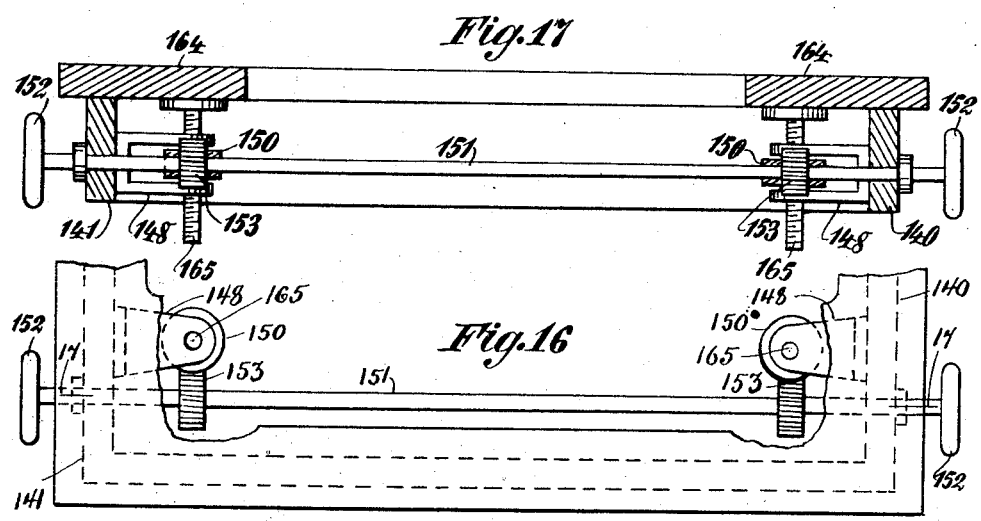
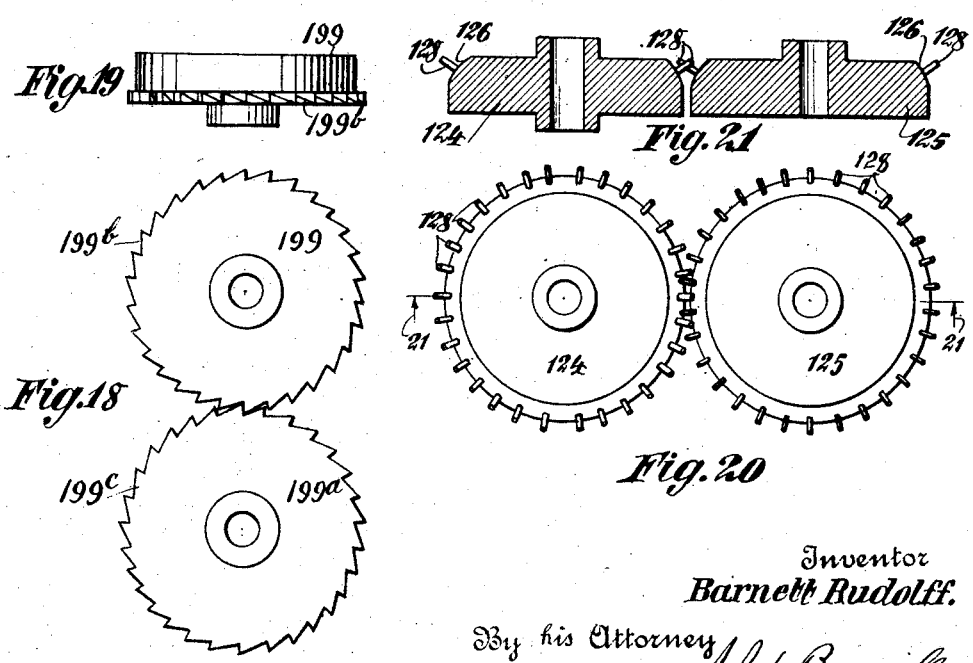
Inventor
Barnett Rudolff.
By his Attorney Patented Aug. 7, 1928.

1,679,377

UNITED STATES PATENT OFFICE.

BARNETT RUDOLFF, OF BAYONNE, NEW JERSEY.

SAW-SHARPENING MACHINE.

Application filed July 27, 1926. Serial No. 125,199.

This invention relates to improvements in a saw sharpening machine, and for the purpose of exemplification is illustrated with cutting and setting appurtenances.

The object of the invention is the production of a saw sharpening machine, in which saws can be easily supported to sharpen their teeth. The second object of the invention is the production of a machine wherewith the teeth of a saw blade can be sharpened at different angles. The third object of the invention is the production of a saw sharpening machine with its parts disposed so that cutting appurtenances and means to set teeth can be easily attached thereto. The fourth object of the invention is the production of a machine, wherewith the opposite sides of the teeth of a saw and the like, can be sharpened at different angles reversed to each other. The fifth object of the invention is the production of a machine whereby the teeth of a saw can be sharpened at angles or straight, that is to say, in planes oblique to the surface of its blade, or at right angles thereto. The sixth object of the invention is the production of a machine, wherein is provided a movable carriage for the sharpening device, and which carriage can be moved parallel to, and at right angles to the saw operated upon, and which can also be located in different levels.

Figure 1:
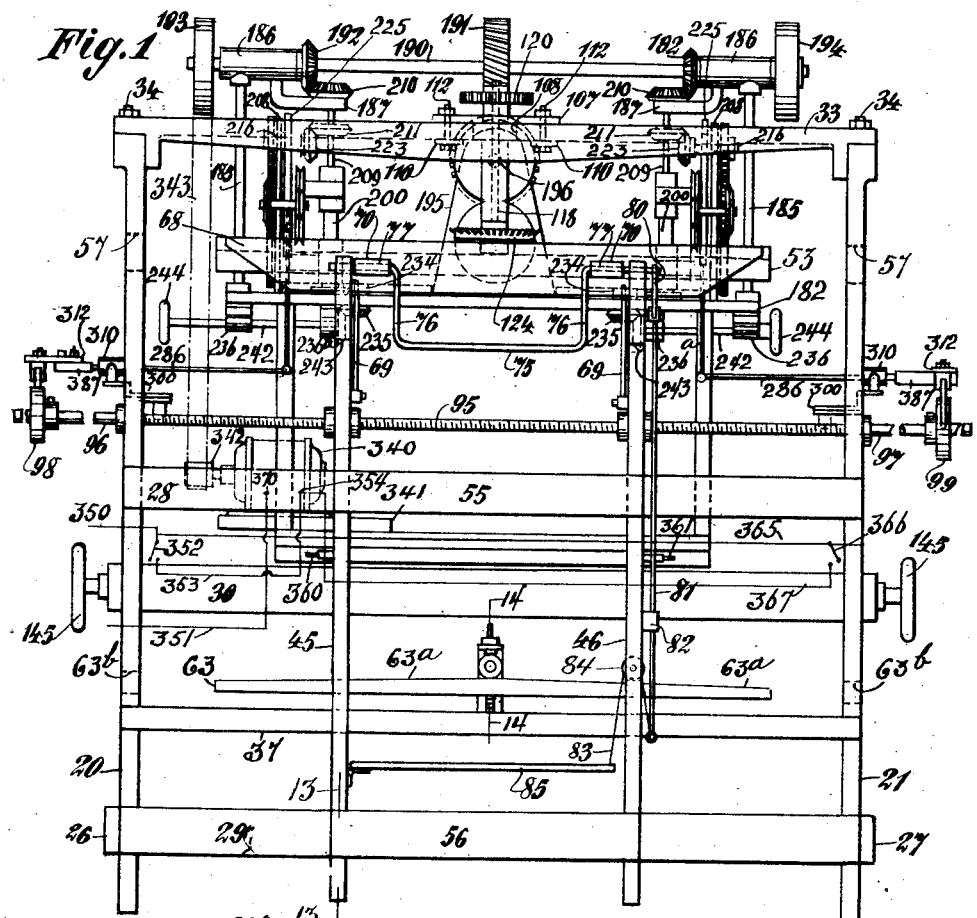
Figure 2:
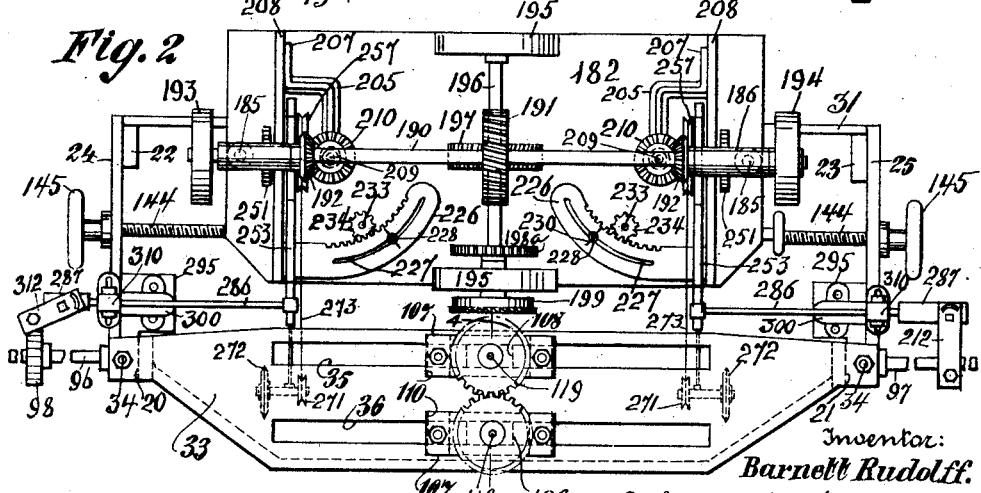

In the accompanying drawings Fig. 1 represents a front elevation of the improved saw cutting, sharpening and setting machine; Fig. 2 shows a top plan view of Fig. 1; Fig. 3 is a right hand side view of Fig. 1; Fig. 4 represents an enlarged section of Fig. 2 on the line 4, 4; Fig. 5 shows a top plan view of some of the details of the machine; Fig. 6 indicates a section of Fig. 3 on the line 6, 6; Fig. 7 represents an enlarged elevation of some details partly in section; Fig. 8 shows a left hand view of Fig. 7 with some additional details; Fig. 9 indicates a section of Fig. 8 on the line 9, 9; Fig. 10 represents a top plan view of Fig. 8; Fig. 11 shows an enlarged side view of some details; Fig. 12 is a top plan view of Fig. 11; Fig. 13 indicates an enlarged section of Fig. 1 on the line 13, 13; Fig. 14 shows an enlarged section of Fig. 1 on the line 14, 14; Fig. 15 is a top plan view of a portion of Fig. 14; Fig. 16 represents an enlarged top plan view of a fragmentary portion of Fig. 5; Fig. 17 shows a section of Fig. 6 on the line 17, 17; Fig. 18 represents an enlarged elevation of some details; Fig. 19 shows a top view of Fig. 18; Fig. 20 represents an enlarged elevation of some details and Fig. 21 indicates a section of Fig. 20 on the line 21, 21.

Referring particularly to Figs. 1 to 6 and 17, 18, the saw cutting, sharpening and setting machine, is in this instance indicated with the main frame, having the front side posts 20, 21, the rear side posts 22, 23, the top side plates 24, 25, the bottom side plates 26, 27, the front top longitudinal plate 28, the front bottom longitudinal plate 29, the intermediate longitudinal front plate 30, the intermediate rear longitudinal plate 31, the bottom rear longitudinal plate 32 and the top platform plate 33. The latter is detachably connected to the top ends of the said posts by the bolts 34. The other adjoining members of the frame are connected by bolts or other suitable means not shown. The top platform 33 has formed therein the two longitudinal guide openings 35 and 36. A longitudinal front plate 37 connects the posts 20 and 21.

A movable frame (see Figs. 1, 3, 4, 11, 12, 13, 14), are indicated with the vertical side plates 45, and 46, each of which at its upper end has formed the spaced members 47 and 48. The members 48 of the side plates of the movable frame are connected by the longitudinal rack plate 53 having the rack teeth 54. The posts 20 and 21, of the frame of the machine have suitable openings 57 through which the ends of the rack plate 53 can extend. Longitudinal plates 55 and 56 connect the plates 45 and 46, by means not shown. The plates 45 and 46 have suitable recesses 59 formed therein to clear the longitudinal plates 28 and 29 of the frame of the machine. Springs 60 are located in said recesses with one end of each seated in a pocket 60ª in the plates 45 and 46. A button 61 extends from the other ends of said spring. Said buttons bear against the top and bottom edges of the plates 28 and 29. Small vertical plates 62 are detachably fastened to the rear ends of the plates 45 and 46, to maintain them in slidable relation with the plates 28 and 29. An adjusting plate 63 with the tapering top edges 63ª is fastened to the side plates 45 and 46, and preferably extends beyond them on their sides, and openings 63ᵇ are formed in the posts 20 and 21 to enable the plate 37 to extend therethrough. A U-shaped bracket 64 has one end fastened to the plate 37 and has journaled therein the shanks of the screw 65. A nut 66 engages the screw 65 and has extending from one side the arm 67, to which is journaled the roller 66$^b$ and from the sides of the nut extends the arms 66$^c$ which contacts with the sides of the bracket 64. An operating disc 66$^d$ is detachably connected to the upper shank of the screw 65. The roller 66$^b$ bears on the edges of the plate 63 and thereby when the movable frame moves it rises as it approaches its middle position and lowers on each side thereof. A clamping bar 68 has extending therefrom the arms 69, and the lower ends of the latter are pivoted to the inner faces of the plates 45 and 46. A pair of hinges 70 extend from the clamping bar 68. A U-shaped adjusting bar is indicated with the lower longitudinal handle 75, from which extend the members 76 at right angles thereto. Longitudinal members 77 extend from the members 76, and the latter have formed therewith the offset portions 78 and 79. An arm 80 extends from the portion 79. A connecting rod 81 has one end pinned to the arm 80, and is guided in the guide bracket 82, extending from the plate 46. A chain 83 has one end fastened to the lower end of the connecting rod 81, passes over a pulley 84 journaled in an opening in the plate 46, and has its other end connected to the treadle 85, which latter is hinged to the plate 45. By means of the clamping bar 68 the saw blade 90 to be operated upon, can be detachably clamped in position. When the clamping bar 68 is located as indicated in the drawings, the offset portions 78 and 79 bear against the spaced members 47, and thereby the said bar bears against the saw blade 90 and forces it against the members 48 to be tightly clamped in position. The clamping position of the bar is obtained, by the operator bearing down on the treadle 85. When the saw blade 90 is to be released the operator swings up the handle 75, which releases the offset portions 78 and 79 from the members 47.

A screw 95 is in threaded engagement with the side plates 45 and 46 of the movable frame of the machine, and its shanks 96 and 97 are journaled in the side posts 20, 21. A ratchet wheel 98 is slidably connected to the shank 96 and a ratchet wheel 99 reversed in position, is slidably connected to the shank 97.

In the guide openings 35 and 36 of the top platform plate 33, are detachably clamped the similar sleeves 105 and 106, which have each extending therefrom adjacent to their upper ends the slide plates 107 and have formed therewith the rectangular portions 108. The latter engage the longitudinal sides of the openings 35 and 36. A pair of clamping plates 110 bear up against the bottom face of the plate 33, and bolts 112 detachably clamp the plates 107 and 110 in different positions on the plate 33 as described. In the sleeve 105 is journaled the spindle 118, and in the sleeve 106 is journaled the spindle 119. Spur gears 120 and 121 mesh with each other and are respectively fastened to said spindles. The spindle 119 has fastened thereto the pinion 122, which meshes with the teeth of the rack plate 53. When the said rack plate 53 moves, as will be described, the pinion 122 rotates and with it the spindle 119 and the rotation of the latter is transmitted to the spindle 118 through the interposed mechanism.

To the lower ends of the spindles 118 and 119 (see Figs. 1, 3, 4, 17 and 18) are fastened a pair of tooth setting wheels 124 and 125. The upper portion of the circumferential edge of each of said wheels is curved as indicated at 126, and setting pins 128 extend from said curved portions. The pins of one wheel extend into the space between the pins of the other wheel. Upon the longitudinal plates 30 and 31 of the frame of the machine is slidably supported the lower carriage (see Figs. 3, 5, 6, 17 and 18) having the longitudinal plates 136 with the projecting flange 137, the longitudinal plate 138 with the projecting flange 139, and the end plates 140, 141 connected to said longitudinal plates. The flanges 137 and 139 bear on the longitudinal plates 30 and 31 of the frame of the machine. A screw 144 has its end portions journaled in the plates 24 and 25, and has connected thereto the operating hand wheels 145. The screw 144 is in threaded engagement with the plates 140 and 141, and by turning the said screw the said lower carriage is longitudinally moved to different positions on the plates 30 and 31 of the frame of the machine. To the plates 140 and 141 of said lower carriage are fastened the U-shaped journal bearings 148, between the members of each of which are located the spiral gears 150. A shaft 151 is journaled in the plates 140 and 141 and has connected to its ends the operating hand wheels 152. spiral gears 153 are fastened to the shaft 151 and mesh with the spiral gears 150.

A vertical adjustable supporting table comprises the longitudinal members 160, 161 and the end members 162 and 163. Extensions 164 are formed with the members 161, 162 and 163. Screws 165 are fastened to and extend below the extensions 164, and are in threaded engagement with the spiral gears 150. When the shaft 151 is turned the spiral gears 153 turn, and the latter turn the spiral gears 150. With the turning of the spiral gears 150, the screws 165 are either raised or lowered, depending upon the direction of rotation of the shaft 151. With the movements of the screws 165 the said supporting table is located at different levels. Guide pins 166 extend from the said supporting plate and engage guide openings in the plates 136 and 138. To the lower face of the said adjustable supporting plate are fastened a pair of journal brackets 167 in which is journaled the shaft 168. Spur gears 169, and hand wheels 170 are fastened to the shaft 168. A pair of guide pins 171 extend up from the supporting table. Upon the said supporting table is slidably supported an upper carriage. The said upper carriage comprises the lower longitudinal members 175, 176 and the lower end members 178 and 179. The latter members have extending from their lower faces the rack teeth 180, which mesh with the spur gears 169. Vertical corner posts 181 extend up from the end members 178 and 179, and support the roof or cover 182. Guide openings 183 are formed in the end members 178 and 179, for the guide pins 171. Posts 185 extend up from the cover 182 and support the journal bearings 186. The latter have extending therefrom the supplemental journal bearings 187. A driving shaft 190 is journaled in the journal bearings 186. A spiral gear 191, the bevel gears 192, the pulley 193 and the polishing wheel 194 are fastened to the driving shaft 190.

A pair of journal brackets 195 extend up from the cover 182 and have journaled therein the shaft 196. The latter has fastened thereto the spiral gear 197 which meshes with the spiral gear 191. A spindle 198 is journaled in one of the brackets 195. Spur gears 198$^a$ and 198$^b$ are respectively fastened to the shaft 196 and spindle 198. Cutter wheels 199 and 199$^a$ are fastened to the shaft 196 and the spindle 198. The cutter wheels 199 and 199$^a$ are respectively provided with cutter teeth 199$^b$ and 199$^c$. A pair of journal and guide sleeves 200 have each extending from their lower ends, a supporting flange 201, and the latter are secured to the roof or cover 182. Two pairs of collars 202, 203 are detachably fastened to each journal and guide sleeve 200. A pair of arms 205 for each of the sleeves 200, have each formed therewith the collar 206 and the foot 207. Each pair of feet 207 of each sleeve 200 supports one of the vertical hinge plates 208. In the supplemental journal bearings 187 are journaled the vertical spindles 209, one of each of which is coaxial with and guided in one of the guide sleeves 200. Bevel gears 210 are fastened to the spindles 209 and mesh with the bevel gears 192. A second bevel gear 211 is fastened to each spindle 209. From each one of the vertical hinge plates 208 extends a guide sleeve 215. A spindle 216 is journaled in each of said guide sleeves 215. At one end of each spindle 216 is fastened the bevel gear 223 which meshes with its adjacent bevel gear 211. At the other end of each spindle 216 is fastened a cam disc 225.

From the lower end of the inner face of each hinge plate 208 extends the curved rack 226, and which has formed therein the curved guide slot 227. The axial line of the slot 227 and the circular axis of the tooth rack 226 are struck from the centers of the guide sleeves 200. Guide pins 228 threaded at their upper ends extend up from the cover 182 through the guide slots 227, and wing nuts 230 are provided for said pins 228, to be enabled to clamp the curved racks in predetermined positions. Spindles 233 are journaled in the cover 182, and each have fastened thereto the pinion 234 and the bevel gear 235. The pinions 234 mesh with the curved racks 226. Two pair of journal brackets 236, 236$^a$, extend from the lower face of the cover 182, and each pair has journaled therein the spindle 242. To one end of each spindle 242 is fastened a bevel gear 243 which meshes with one of the bevel gears 235. An operating hand wheel 244 is fastened to the outer end of each of the spindles 242. By means of the hand wheels 244 the hinge plates can be swung to different angular positions and in so doing the bevel gears 223 roll on the bevel gears 211.

In each of the hinge plates 208 is journaled a spindle 248, which at one end thereof has fastened thereto the spur gear 250 on the outer face of said hinge plate. A spur gear 251 is fastened to each spindle 216 and meshes with the spur gear 250. The said spindle 248 extends through the elongated guide openings 252 of the movable beam 253. A second elongated guide opening 254 is formed in each beam 253 and engages a guide pin 255 extending from the hinge plate 208 and threaded at its upper end for the wing nut 256. A grooved pulley 257 is fastened to the spindle 248. A spindle 258 is journaled in each hinge plate 208, and at one end has fastened thereto the spur gear 260 which meshes with the spur gear 250. A cam disc 261 similar to the cam disc 225 is fastened to the spindle 258. The beam 253 has formed in its top and bottom edges, cam faces 262 and 263, which coact with said cam discs 225 and 261 to vertically move said beam 253. From the outer end of each beam 253 extends the sleeve 267. An arm 268 is adjustably supported in each sleeve 267 and at its outer end has connected thereto the tubular cross connection 269, in which is journaled a spindle 270. At one end of each spindle 270 is fastened a grooved pulley 271, and at its other end is fastened a sharpening disc 272. A belt 273 connects each pulley 271 with one of the pulleys 257, one of said belts is straight while the other is a cross belt. A screw 275 detachably clamps the arm 268 to the sleeve 267. Upon each of the sleeves 267 is slidably secured the sleeve 280 by means of the screw 281. The lower end of each sleeve has formed therewith a ball 282. A vertical rod 283 has provided therefor the socket connection 284, which with the ball 282 forms a ball and socket joint. A connecting rod 286 has one end pinned to the lower end of the vertical rod 283, and at its other end it has connected thereto the supporting block 287. A bracket 292 is indicated with the top shelf 293 and the feet 294. The latter are fastened to the shelf 295 extending from each of the side posts 20 and 21. Upon each of the shelves 293 is detachably clamped the knee bracket comprising the lower elongated member 300, the vertical member 301 and the upper member 302.

An elongated opening 304 is formed in the member 300. By means of the bolt 305, which extends from the shelf 293 and its nut, the member 300 can be clamped in different positions on its shelf 293. A bifurcated journal bracket 306 is detachably connected to the member 302. A sleeve 310 is slidably secured to the connecting rod 286 and has extending therefrom the trunnions 311 which are supported in the journal bracket 306.

To the supporting block 287 is hinged the supporting plate 312 by means of the hinge bolt 313. A curved opening 315 is formed in the supporting plate 312. A bolt 316 extends from the block 287 through the opening 315 of the plate 312 and a wing nut 320 is provided for the bolt 316. The plate 312 can be clamped in different angular positions to the block 287. A bifurcated journal bracket 321 has extending therefrom the threaded shank 322 and can be detachably secured in different rotative positions to the supporting plate 312. A pin 323 extends from the plate 312. A pawl 325 is hinged to each of the journal brackets and can be located in proper positions for the ratchet wheels 98 and 99, one reversed to the other. A pin 326 extends from each pawl 325 and a spring 327 connects each pair of pins 323 and 326. A screw eye 328 extends from each pawl 325 and a little latch arm 330 is connected to each supporting plate 312 to maintain each of the pawls 325 disengaged from its ratchet wheel.

An electric motor 340 is mounted upon the platform 341 and which latter is supported upon the members 175 and 179 of the upper carriage. The motor is indicated with the pulley 342, which is connected with the pulley 193, by means of the belt 343. Wires 350, 351 for electric current lead to and are connected to the post 22 of the main frame. The wire 350 has a switch 352 connected thereto. A wire 353 leads from said switch to the binding post 354 of the electric motor. An arm 360 extends from the plate 45 of the movable frame and is positioned to open the switch 352, when the plate is moved adjacent to the post 20. An arm 361 similar to 360, extends from the plate 46. A wire 365 extends from the wire 350 and leads to the switch 365 supported on the post 21. A wire 367 leads from the switch 365 to the binding post 354. The wire 351 leads to the binding post 370 of the said electric motor. The arm 361 is adapted to open the switch 366. It is to be noted that the arm 268 can be clamped in different angular positions in the sleeve 267, to position the sharpening disc 272 in different angular positions.

By means of the operating hand wheels 145 and the screw 144, the lower carriage having the longitudinal plates 136 and 138 can be longitudinally and horizontally moved to different positions.

By means of the hand wheels 152 and their appurtenances, the table having the longitudinal members 160 and 161 can be raised to different levels, and by means of the hand wheels 170 and their appurtenances the lower carriage can be horizontally moved at right angles to its other horizontal movement.

To sharpen the saw blade 90 it is clamped in position by means of the clamping bar 68, and the beams 253 are caused to move up and down with the rotation of the spindles 216 and 258, which turn the cam discs 225 and 261. The said cam discs coact with the cam faces 262, and 263 of the beams 253, whereby the latter are raised and lowered. At the same time the pulleys 257 are turned, whereby the pulleys 271 are turned, and with the latter the sharpening discs 272 sharpen the teeth of the saw blade 90, at predetermined angles depending upon the angular positions of the hinge plates 208. One of said sharpening discs turns in one direction and the other in an opposite direction.

When the beams 253 are moving down, the connecting rods 286 are caused to swing, which in turn actuate the pawls 325, to turn the ratchet wheels 98 and 99. Each one of the pawls may be swung and kept clear of its ratchet wheel by connecting one of the latch arms 330 to its adjacent screw eye 328.

The ratchet wheel 98 turns the screw 95 in one direction, and the ratchet wheel 99 turns it in an opposite direction. With the turns of the screw 95, the movable frame intermittently moves and carries the saw blade in proper position. When the movable frame approaches the ends of its stroke, the switches 352 and 366 are alternately opened. After one of the switches 352 or 366 has been opened, the operator closes the switch which has been previously opened and the frame then reverses its stroke.

Various modifications may be made in the invention and the present exemplification is to be taken as illustrative and not limitative thereof.

Having described my invention what I desire to secure by Letters Patent and claim is:

1. In a saw sharpening machine, the combination of a main frame, a slidable frame supported on one side of the main frame, a hinge plate pivoted in the machine on the side of the main frame opposite to the slidable frame, a pivot extending through the hinge plate, a beam guided on the pivot of the hinge plate, a driving shaft journaled in the machine over said hinge plate, means interposed between said shaft and beam to move the latter, other means coacting with the first means to turn said pivot, a pulley supported on the pivot, a sleeve extending from one end of the beam, an arm extending from said sleeve, a connection extending from said arm, a spindle journaled in said connection, a sharpening disc fastened to one end of the latter spindle and a pulley at its other end, a belt connecting the two pulleys and means to clamp a saw blade in the movable frame.

2. In a saw sharpening machine, the combination of a main frame, a slidable frame supported on said frame at the front thereof, a hinge plate pivoted in the machine at the rear of the main frame, means to locate the hinge plate in different angular positions, a spindle pivoted in the hinge plate, a driving shaft journaled in the machine, means to transmit rotation from the driving shaft to said spindle to rotate the latter with the hinge plate located in different angular positions, a second spindle journaled in the hinge plate, a beam guided by the second spindle, a third spindle journaled in the hinge plate, means coacting with the first and third spindles to move the beam up and down, a sharpening disc associated with the beam and means to clamp a saw blade in the said movable frame.

3. In a saw sharpening machine the combination of a main frame, a movable frame slidably supported in the main frame, a carriage supported in the frame, a journal and guide sleeve carried on said carriage, a hinge plate pivoted on said journal and guide sleeve, posts extending up from said carriage, journal bearings supported by said posts, a driving shaft journaled in said journal bearings, a vertical spindle with one end journaled in said sleeve, transmission means between said spindle and driving shaft, a horizontal spindle journaled in said hinge plate, transmission means between the two spindles, a second and a third horizontal spindle journaled in the hinge plate, transmission means between the horizontal spindles, a beam vertically guided by the second horizontal spindle, means connected to the two horizontal spindles to vertically move the beam, a sharpening disc associated with the beam, means interposed between the second horizontal spindle and said sharpening disc to turn the latter, and means to clamp a saw blade to the movable frame.

4. In a saw sharpening machine the combination of a main frame, a movable frame slidably supported in the main frame, a carriage supported in the frame, a pair of hinge plates pivoted to said carriage, means to locate the hinge plate in different angular positions, a beam slidably connected to each hinge plate, a rotative driving shaft above the carriage, means interposed between the driving shaft and both of said beams to vertically move the latter, a sharpening disc associated with each beam, means to turn said discs during the movements of the beams, and means to clamp a saw blade in the movable frame.

5. In a saw sharpening machine the combination of a main frame, a movable frame slidably supported in the main frame, a carriage supported in the frame, a pair of hinge plates pivoted to said carriage, means to locate the hinge plates in different angular positions, a beam slidably connected to each hinge plate, a driving shaft above said hinge plate, means to turn the shaft, means interposed between the driving shaft and both said beams to vertically move the latter, a sharpening disc associated with each beam, means to turn said discs during the movements of the beam, means interposed between one of said beams and the movable frame to move the latter in one direction, means interposed between the other beam and said movable frame to move the latter in an opposite direction, means interposed between the two frames to vertically move the movable frame during its travel in a horizontal direction and means to clamp a saw blade in the movable frame.

6. In a saw sharpening machine the combination of a main frame, side posts for the main frame, a longitudinal plate connected to said side posts, a bracket extending from said longitudinal plate, a screw rotatively supported in said bracket, a nut in engagement with said screw, means to turn the screw, means to maintain the nut in the same angular position, an arm extending from the nut, a roller journaled to the arm, a movable frame slidably connected to the main frame, means to move the movable frame, an adjusting plate connected to the movable frame contacting with the roller to vertically move the movable frame during its horizontal movement.

In testimony whereof I affix my signature.

BARNETT RUDOLFF.